UNITED STATES PATENT OFFICE.

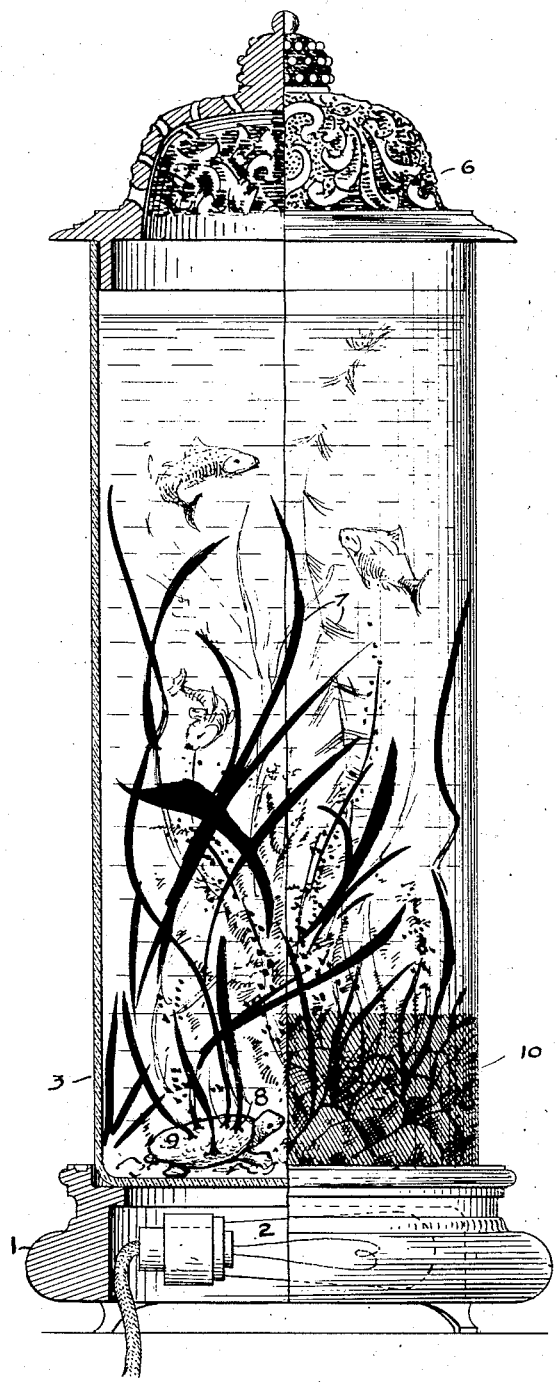

NATSUO SATO, OF SAN FRANCISCO, CALIFORNIA.

ILLUMINATED AQUARIUM.

1,333,454.  Specification of Letters Patent.  Patented Mar. 9, 1920.

Application filed September 22, 1919. Serial No. 325,409.

*To all whom it may concern:*

Be it known that I, NATSUO SATO, a subject of the Emperor of Japan, residing at San Francisco, in the county of San Francisco and State of California, have invented new and useful Improvements in Illuminated Aquariums, of which the following is a specification.

The present invention relates to improvements in domestic aquariums, the object of the invention being to provide an aquarium of pleasing appearance and which will be illuminated in an attractive manner.

In the accompanying drawing, the figure is a broken side view of my improved aquarium.

Referring to the drawing, 1 indicates a suitable hollow base, preferably circular in form, in which are contained one or more electric lamps 2, one only being here shown. Said base is open at the top and upon the top thereof is supported the main body 3 of the acquarium in the form of a glass cylinder having a glass closed bottom formed in one piece with the glass cylinder. Closing the top of the cylinder is an ornamental top 6. In said cylinder are contained a number of aquatic plants or grasses 7, the bottoms of which are tied or otherwise secured, as shown at 8, to weighted objects 9 which may be in the form of small imitation turtles, rocks, or other objects, serving as anchors to anchor the plants to the bottom of the cylinder.

I do not, however, cover the bottom of the cylinder with sand or gravel, but allow the light of the lamp to shine therethrough. The rays of the lamp impinging upon the grasses or plants and upon the gold fishes or other fishes swimming in the aquarium produce a very pleasing effect.

In order that the direct rays of the lamp will not impinge upon the eye of the observer, I preferably paint the exterior surface of the lower portion of the cylinder, as shown at 10, to represent rocks and aquatic vegetation clinging thereto. These painted representations, illuminated by the rays of the electric lamp traversing the water, add greatly to the pleasing effect of the aquarium.

I claim:—

1. An aquarium comprising a glass vessel, water therein, aquatic vegetation anchored to the bottom of the vessel, and an electric lamp disposed below the lower ends of the vegetation and shining upwardly on all of said vegetation.

2. An aquarium comprising a glass vessel, having a glass bottom, water in the vessel, aquatic vegetation in the vessel, an opaque base having an opening in its upper side and supporting the vessel, and a source of light in said base below the bottom of the vessel.

3. An aquarium comprising a glass vessel, water therein, aquatic vegetation mounted in the vessel, said vessel being translucent adjacent to the lower end thereof, and a source of illumination disposed below the upper edge of the translucent portion and shining upon said portion and upwardly on the vegetation.

N. SATO.